(12) United States Patent
Stucky

(10) Patent No.: US 9,296,407 B1
(45) Date of Patent: Mar. 29, 2016

(54) MULTI-FUNCTIONAL SLED APPARATUS

(71) Applicant: Travis L. Stucky, Ogilvie, MN (US)

(72) Inventor: Travis L. Stucky, Ogilvie, MN (US)

( * ) Notice: Subject to any disclaimer, the term of this patent is extended or adjusted under 35 U.S.C. 154(b) by 0 days.

(21) Appl. No.: 14/611,252

(22) Filed: Feb. 1, 2015

(51) Int. Cl.
*B62B 13/06* (2006.01)
*B62B 17/06* (2006.01)
*B62B 17/02* (2006.01)

(52) U.S. Cl.
CPC ............... *B62B 13/06* (2013.01); *B62B 17/02* (2013.01); *B62B 17/063* (2013.01)

(58) Field of Classification Search
CPC .......... A01K 97/01; A45C 5/06; A45C 7/005; A45C 2009/002; B62B 13/02; B62B 13/06; B62B 13/16; B62B 15/00; B62B 15/002; B62B 15/007; B62B 17/02; B62B 17/06; B62B 17/063; B62B 2202/402; B62B 2202/408
See application file for complete search history.

(56) References Cited

U.S. PATENT DOCUMENTS

| | | | | | |
|---|---|---|---|---|---|
| 154,353 | A | * | 8/1874 | Sumner et al. | 280/845 |
| 1,585,575 | A | * | 5/1926 | Van Husan | 280/28.12 |
| 2,437,767 | A | * | 3/1948 | Thompson | 280/19 |
| 3,826,270 | A | * | 7/1974 | Hentges | 280/19.1 |
| 4,070,030 | A | * | 1/1978 | Clark | 280/24 |
| 4,561,666 | A | * | 12/1985 | Aumann | 280/20 |
| 5,294,163 | A | * | 3/1994 | Lang | 294/161 |
| 5,575,490 | A | * | 11/1996 | Simpson, Jr. | 280/28.12 |
| 5,979,102 | A | * | 11/1999 | Sagryn | 43/21.2 |
| 2005/0173874 | A1 | * | 8/2005 | Bouchard | 280/28.17 |
| 2007/0209837 | A1 | * | 9/2007 | Gancarz et al. | 175/18 |
| 2008/0099355 | A1 | * | 5/2008 | Bakker | 206/349 |

* cited by examiner

*Primary Examiner* — Frank Vanaman
(74) *Attorney, Agent, or Firm* — Dave Alan Lingbeck

(57) ABSTRACT

A multi-functional sled apparatus for transporting items predominately used in ice fishing and also being used as a seat and support for fishing rods. The multi-functional sled apparatus includes runners spaced apart with each having a topside; a frame assembly supported upon the runners; a platform supported upon the frame assembly; rod holders pivotably attached to the frame assembly; and an auger support assembly removably mounted to the frame assembly.

9 Claims, 2 Drawing Sheets

MULTI-FUNCTIONAL SLED APPARATUS

BACKGROUND OF THE INVENTION

1. Field of the Invention

The present invention relates to sleds and more particularly pertains to a new multi-functional sled apparatus for transporting items predominately used in ice fishing and also being used as a seat and support for fishing rods.

2. Description of the Prior Art

The use of sleds is known in the prior art. More specifically, sleds heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a transportable shelter providing convective heat and a heated seat for the user's comfort, and providing heat to prevent the formation of ice in an enclosed fish hole when ice-fishing. Another prior art describes a mobile ice fishing shelter assembly for permitting quick and easy movement of a mobile shelter designed to facilitate ice fishing. Also, another prior art describes a portable ice fishing shelter construction including a hull member having a floor provided with exterior sidewalls and a centrally offset enlarged aperture dimensioned to receive the lower torso of an occupant and surrounded by raised interior sidewalls which define an interior well within the hull member, wherein the raised interior sidewalls are provided with a pair of handle members for lifting and carrying the hull member while being surrounded thereby; and, wherein the hull member is further provided with a collapsible cover unit. Further, another prior art describes a combination sled and shelter device for use while ice-fishing or the like comprising a drumshaped container body disposed on a pair of snow runners and having doors in the cylindrical drum surface. Yet, another prior art describes a convertible sled arrangement for transporting a cooler to and from a beach wherein the arrangement includes a framework unit dimensioned to receive and support a cooler relative to a pair of runner members operatively associated with the framework unit. While these devices fulfill their respective, particular objectives and requirements, the aforementioned patents do not disclose a new multi-functional sled apparatus.

SUMMARY OF THE INVENTION

The general purpose of the present invention, which will be described subsequently in greater detail, is to provide a new multi-functional sled apparatus which has many of the advantages of the sleds mentioned heretofore and many novel features that result in a new multi-functional sled apparatus which is not anticipated, rendered obvious, suggested, or even implied by any of the prior art sleds, either alone or in any combination thereof. The present invention includes runners spaced apart with each having a topside; a frame assembly supported upon the runners; a platform supported upon the frame assembly; rod holders pivotably attached to the frame assembly; and an auger support assembly removably mounted to the frame assembly. None of the prior art includes the combination of the elements of the present invention.

There has thus been outlined, rather broadly, the more important features of the multi-functional sled apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new multi-functional sled apparatus which has many of the advantages of the sleds mentioned heretofore and many novel features that result in a new multi-functional sled apparatus which is not anticipated, rendered obvious, suggested, or even implied by any of the prior art sleds, either alone or in any combination thereof.

Still another object of the present invention is to provide a new multi-functional sled apparatus for transporting items predominately used in ice fishing and also being used as a seat and support for fishing rods.

Still yet another object of the present invention is to provide a new multi-functional sled apparatus that can either be moved upon snow or ice manually by hand or by a vehicle.

Even still another object of the present invention is to provide a new multi-functional sled apparatus that conveniently supports and stores all items that are used in ice fishing in particular These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
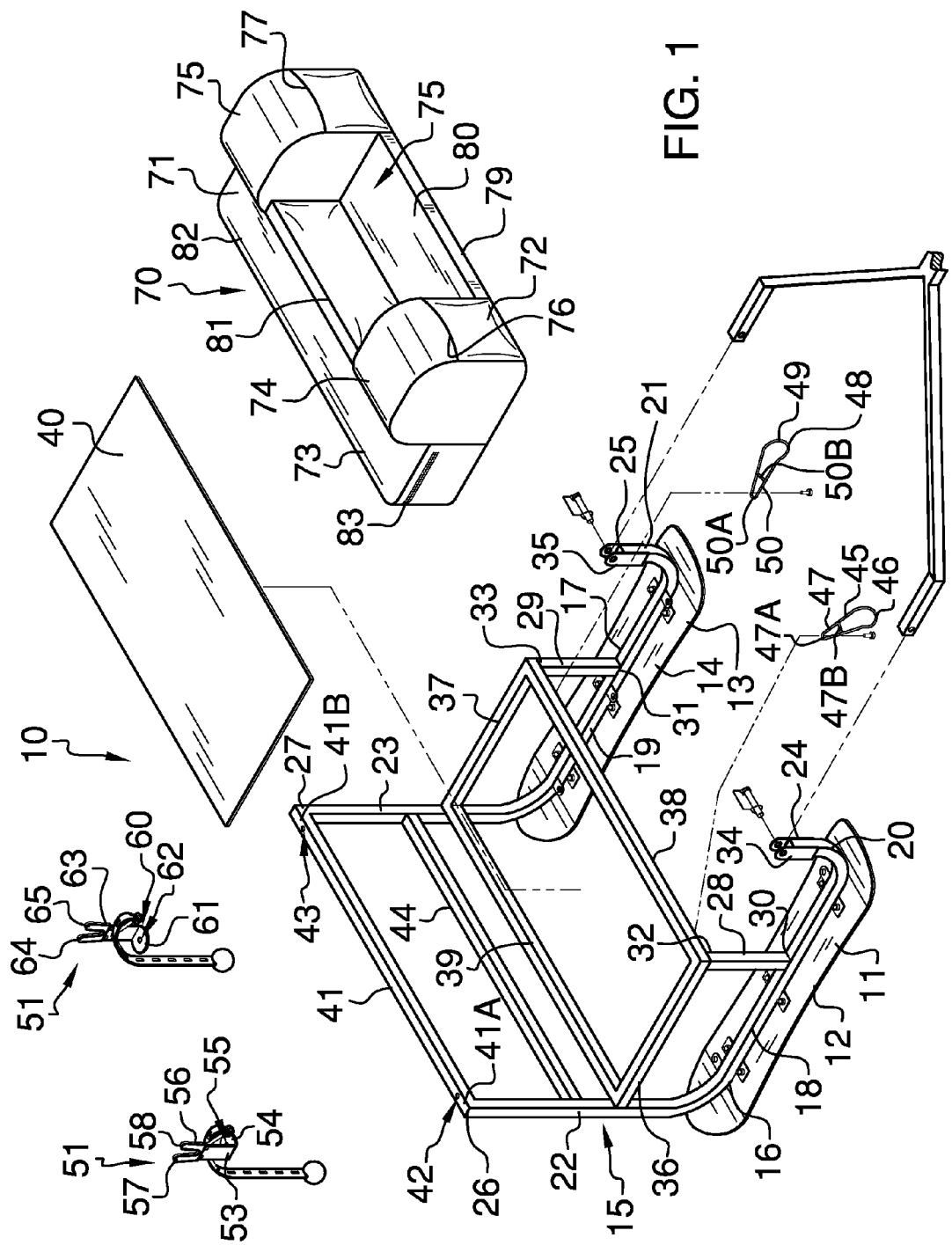
FIG. 1 is an exploded perspective view of a new multi-functional sled apparatus according to the present invention.
Figure 2:
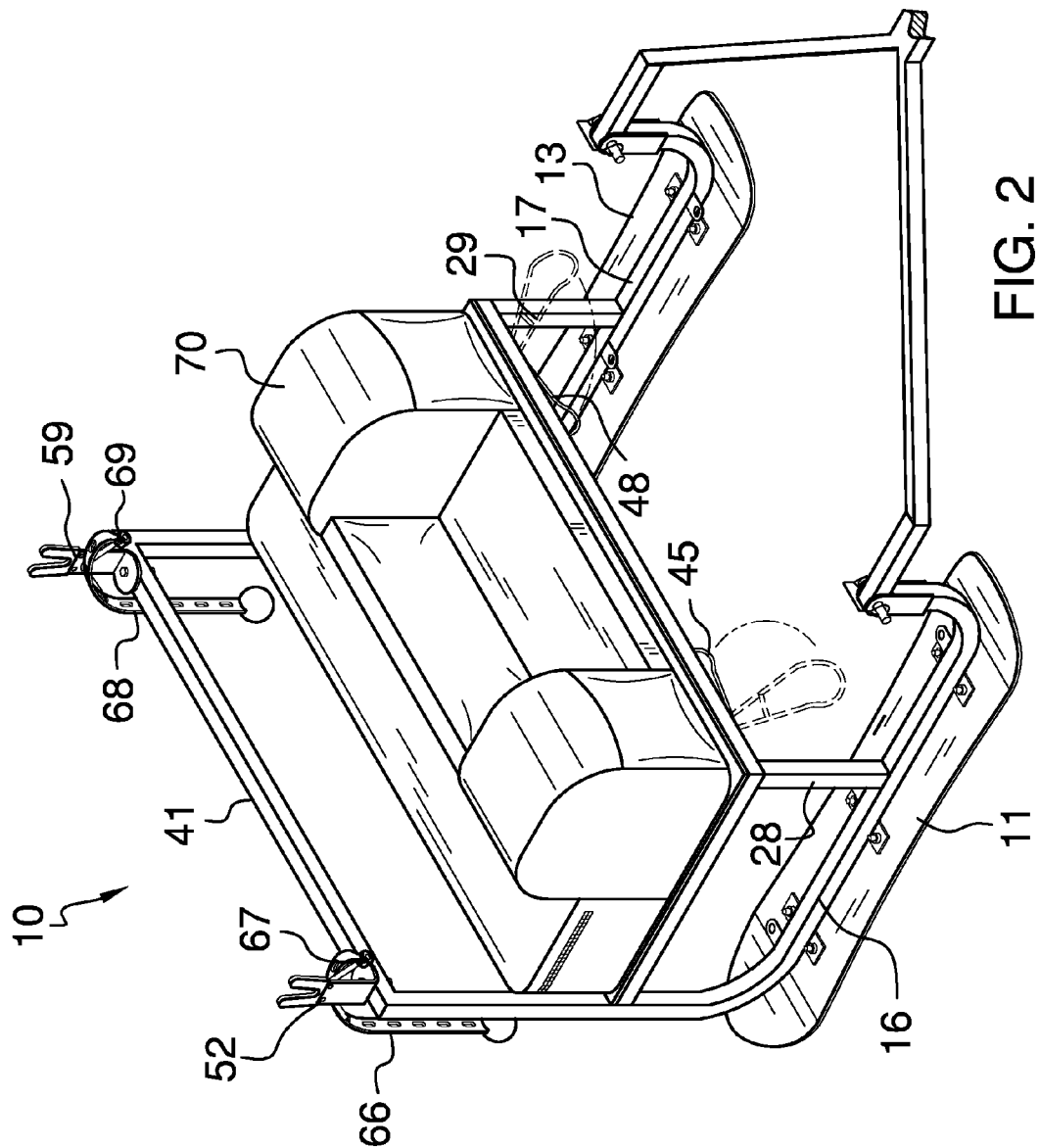
FIG. 2 is a perspective view of the present invention.

With reference now to the drawings, and in particular to FIGS. 1 and 2 thereof, a new multi-functional sled apparatus embodying the principles and concepts of the present invention and generally designated by the reference numeral 10 will be described.

As best illustrated in FIGS. 1 and 2, the multi-functional sled apparatus 10 generally may comprise a pair of runners 11, 13 which are ski runners spaced apart with each having a topside 12, 14; a frame assembly 15 conventionally supported upon the runners 11, 13; a platform 40 conventionally supported upon the frame assembly 15; rod holders 45, 48 pivotably, spacedly, and conventionally attached to the frame assembly 15; and an auger support assembly 51 removably and conventionally mounted to the frame assembly 15.

As shown in FIGS. 1 and 2, the frame assembly 15 may include a pair of elongate base members 16, 17 each securely and conventionally attached with fasteners upon the topside 12, 14 and extending longitudinally of a respective runner 11, 13. Each of the elongate base members 16, 17 may have a front end portion 20, 21, a main portion 18, 19 conventionally attached to and extending longitudinally upon the respective runner 11, 13, and a back end portion 22, 23 having a top end 26, 27. Each of the front end portions 20, 21 is angled relative to the respective main portion 18, 19 and extends upwardly and outwardly away from the topside 12, 14 of the respective runner 11, 13. Each of the front end portions 20, 21 may have a top end 24, 25 terminating in a clevis 34, 35 for fastening to a hitch coupler for pulling or towing the sled apparatus 10. Each of the back end portions 22, 23 may be angled relative to the respective main portion 18, 19 and may extend upwardly and outwardly away from the topside 12, 14 of the respective runner 11, 13. Each of the back end portions 22, 23 may have a length longer than and may extend upwardly higher than that of the front end portion 20, 21 of the respective elongate base member 16, 17. The frame assembly 15 may further include top and bottom braces 41, 44 conventionally attached to and interconnecting the back end portions 22, 23 of the elongate base members 16, 17. The top brace 41 may be conventionally attached to the top ends 26, 27 of the back end portions 22, 23 and may have holes 42, 43 transversely disposed therethrough proximate to each end 41A, 41B of the top brace 41. The frame assembly 15 may further include support posts 28, 29 having top and bottom ends 30-33 with the bottom end 30, 31 of each support post 28, 29 securely and conventionally attached to a respective elongate base member 16, 17 with each support post 28, 29 extending upwardly and outwardly away from the topside 12, 14 of the respective runner 11, 13. Each of the support posts 28, 29 may be conventionally coupled to and disposed intermediate of the respective main portion 18, 19. The frame assembly 15 may also include elongate platform support members 36, 37 each conventionally attached at the top end 32, 33 of a respective support post 28, 29 and conventionally attached to and interconnecting the respective support post 28, 29 to a respective back end portion 22, 23 with each of the elongate platform support members 36, 37 spaced above and extending parallel to the main portion 18, 19 of a respective elongate base member 16, 17. The frame assembly 15 may further include a front elongate cross member 38 conventionally attached to and interconnecting the top ends 32, 33 of the support posts 28, 29, and a back elongate cross member 39 conventionally attached to and interconnecting the elongate platform support members 36, 37.

As illustrated in FIGS. 1 and 2, the platform 40 may be a rigid planar member securely and conventionally disposed upon the support posts 28, 29, the front and back elongate cross members 38, 39, and the elongate platform support members 36, 37. The platform 40 may be spaced above the runners 11, 13 and may be spaced below the top brace 41. Each of the rod holders 45, 48 includes a conical endless filament of rigid material such as wire having an enlarged distal portion 46, 49, an inwardly tapered proximate portion 47, 50 forming a vertex 47A, 50A which is pivotably and conventionally attached to a bottom 38A of the front elongate cross member 38 rod and also having a transverse engagement member 47B, 50B extending across and conventionally attached to the respective proximate portion 47, 50 with each of the rod holders 45, 48 adapted to receive and support a handle of a fishing. The enlarged distal portion 46, 49 of each of the rod holders 45, 48 pivotably extends outwardly from the front elongate cross member 38 forward of the platform 40 when in use and is pivotably disposed under the platform 40 when not in use.

As shown in FIGS. 1 and 2, the auger support assembly 51 may include support brackets 52, 59 each having an L-shaped lower portion 53, 60 having an end portion 54, 61 with a hole 55, 62 transversely disposed therethrough with the end portion 54, 61 fastenable to the top brace 41 and also includes an upper fork portion 56, 63 having spaced prongs 57, 58, 64, 65 which extends upwardly from the top brace 41 to retain an auger between the prongs 57, 58, 64, 65. The support brackets 52, 59 may be fastenable with fastening members to the holes 42, 43 of the top brace 41. The auger support assembly 51 may further include straps 66, 68 each having an end 67, 69 conventionally attached to a respective support bracket 52, 59 for wrapping about and securing the auger upon the support brackets 52, 59.

The multi-functional sled apparatus 10 may further include a storage bag assembly 70 removably and conventionally secured upon the platform 40. The storage bag assembly 70 may include a duffle bag 71 having a front section 72 and a back section 73. The front section 72 may include opposed end storage compartments 74, 75 each having a closure 76, 77 for securing any items stored in the end storage compartments 74, 75. The front section 72 may also include a recessed area 78 disposed between the opposed end storage compartments 74, 75. The recessed area 74, 75 may include a seat 79 with a removable cushion 80 and may also include a backrest 81 for a user to sit upon the sled apparatus 10 while ice fishing in particular. The back section 73 may be an elongate storage compartment 82 having a closure 83 and extending the length of the front section 72.

In use, a hitch coupler may be connected to the clevises 34, 35 of the elongate base members 16, 17 and then hitched to a prime mover or simply pulled by the user walking upon the ice on a lake for example. All of the equipment needed to ice fish is either stored in the duffle bag 71 or secured to the support brackets 52, 59. Once at the desired site, the user may remove the equipment from the duffle bag 71 and also the auger from the support brackets 52, 59 and use the auger to drill the fishing hole through the ice and remove the fishing rods from the duffle bag 71 and also pivot the filaments of rigid material 45, 48 outwardly from under the platform 40 and forwardly to the front of the platform 40 and secure the fishing rods to the filaments of rigid material 45, 48 with the user being seated in the recessed area 78 of the duffle bag 71. Once finished, the equipment can be packed up and restored upon the sled apparatus 10 and the prime mover or the user can pull the sled back.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the multi-functional sled apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A multi-functional sled apparatus comprising:
   runners spaced apart with each said runner having a topside;
   a frame assembly supported upon the runners wherein the frame assembly includes elongate base members each securely attached upon the topside of a respective said runner, wherein each of the elongate base members has a front end portion, a main portion attached to and extending longitudinally upon the respective runner, and a back end portion with a top end, wherein each of the back end portions is angled relative to a respective said main portion and extends upwardly and outwardly away from the topside of the respective runner, wherein each of the back end portions has a length longer than and extends upwardly higher than that of the front end portion of the respective elongate base member;
   a platform supported upon the frame assembly;
   rod holders pivotably attached to the frame assembly; and
   an auger support assembly removably mounted to the frame assembly.

2. The multi-functional sled apparatus as described in claim 1, wherein the frame assembly further includes top and bottom braces attached to and interconnecting the back end portions of the elongate base members, wherein the top brace is attached to the top ends of the back end portions and has holes transversely disposed therethrough proximate to each end of the top brace.

3. The multi-functional sled apparatus as described in claim 2, wherein the auger support assembly includes support brackets each having an L-shaped lower portion having an end portion with a hole transversely disposed therethrough and with the end portion being fastenable to the top brace and also includes an upper fork portion having spaced prongs which extends upwardly from the top brace to retain an auger between the prongs, wherein the support brackets are fastenable at the holes of the top brace.

4. The multi-functional sled apparatus as described in claim 3, wherein the auger support assembly further includes straps each having an end attached to a respective said support bracket for securing the auger upon the support brackets.

5. A multi-functional sled apparatus comprising:
   runners spaced apart with each said runner having a topside;
   a frame assembly supported upon the runners, wherein the frame assembly includes elongate base members each securely attached upon the topside of a respective said runner and having a back end portion, wherein the frame assembly further includes support posts each having top and bottom ends with each said bottom end securely attached to a respective said elongate base member and with each said support post extending upwardly and outwardly away from the topside of the respective runner, wherein the frame assembly also includes elongate platform support members each attached to the top end of a respective said support post and attached to and interconnecting a respective said support post and a respective said back end portion, wherein the frame assembly further includes a front elongate cross member attached to and interconnecting the top ends of the support posts, and a back elongate cross member attached to and interconnecting the elongate platform support members;
   a platform supported upon the frame assembly;
   rod holders pivotably attached to the frame assembly; and
   an auger support assembly removably mounted to the frame assembly.

6. The multi-functional sled apparatus as described in claim 5, wherein the platform is a rigid planar member securely disposed upon the support posts, the front and back elongate cross members, and the elongate platform support members, wherein the platform is spaced above the runners.

7. The multi-functional sled apparatus as described in claim 5, wherein each of the rod holders includes a conical endless filament of rigid material having an enlarged distal portion, a narrowed proximate portion tapered inwardly to form a vertex which is pivotably attached to a bottom of the front elongate cross member, and also having a transverse engagement member extending across and attached to the respective proximate portion with each of the rod holders adapted to receive and support a handle of a fishing rod, wherein the enlarged distal end portion of each of the rod holders pivotably extends outwardly from the front elongate cross member forward of the platform when in use and is pivotably disposed under the platform when not in use.

8. A multi-functional sled apparatus comprising:
   runners spaced apart with each said runner having a topside;
   a frame assembly supported upon the runners;
   a platform supported upon the frame assembly;
   rod holders pivotably attached to the frame assembly;
   an auger support assembly removably mounted to the frame assembly;
   a storage bag assembly removably secured upon the platform, wherein the storage bag assembly includes a duffle bag having a front section and a back section, wherein the front section includes opposed end storage compartments each having a closure, wherein the front section also includes a recessed area disposed between the opposed end storage compartments, wherein the recessed area includes a seat with a removable cushion and also includes a backrest for a user to sit upon the sled apparatus.

9. The multi-functional sled apparatus as described in claim 8, wherein the back section is an elongate storage compartment having a closure and extending the length of the front section.

* * * * *